United States Patent
Guo

(10) Patent No.: US 9,337,771 B2
(45) Date of Patent: May 10, 2016

(54) MOUNTING BRACKET FOR JUNCTION BOX, JUNCTION BOX WITH THE MOUNTING BRACKET, AND SOLAR CELL MODULE

(71) Applicant: DELTA ELECTRONICS, INC., Kuei San, Taoyuan Hsien (TW)

(72) Inventor: Guangwei Guo, Kuei San (TW)

(73) Assignee: DELTA ELECTRONICS, INC. (TW)

( * ) Notice: Subject to any disclaimer, the term of this patent is extended or adjusted under 35 U.S.C. 154(b) by 166 days.

(21) Appl. No.: 14/154,848

(22) Filed: Jan. 14, 2014

(65) Prior Publication Data

US 2014/0202523 A1    Jul. 24, 2014

(30) Foreign Application Priority Data

Jan. 18, 2013 (CN) .......................... 2013 1 0017588

(51) Int. Cl.
*H05K 7/14* (2006.01)
*H01L 31/042* (2014.01)
*H02S 40/34* (2014.01)

(52) U.S. Cl.
CPC ................ *H02S 40/00* (2013.01); *H02S 40/34* (2014.12)

(58) Field of Classification Search
CPC ............ H02S 40/00; H02S 40/34; H02B 1/46
USPC ......................................... 174/545; 248/689
See application file for complete search history.

(56) References Cited

U.S. PATENT DOCUMENTS

| | | | | |
|---|---|---|---|---|
| 6,654,186 B2 * | 11/2003 | Klarner | ..................... | G02B 7/00 248/316.4 |
| 7,938,376 B2 * | 5/2011 | Jimenez | ................... | B60R 11/00 248/229.16 |
| 8,462,518 B2 * | 6/2013 | Marroquin | ............... | H05K 7/10 136/243 |
| 8,690,110 B2 * | 4/2014 | Shmukler | ................. | F16B 1/00 248/237 |
| 8,701,254 B2 * | 4/2014 | Lin | ........................... | B25B 5/06 24/336 |
| 2010/0288554 A1 * | 11/2010 | Jafari | ..................... | H02G 3/126 174/545 |
| 2012/0211062 A1 * | 8/2012 | Yamazaki | ............... | H02S 40/34 136/252 |
| 2014/0161399 A1 * | 6/2014 | Hsieh | ................... | G02B 6/4269 385/92 |
| 2014/0366931 A1 * | 12/2014 | Chiu | ........................ | H02S 40/34 136/251 |
| 2015/0144181 A1 * | 5/2015 | Gilchrist | ................. | H02S 40/32 136/251 |

FOREIGN PATENT DOCUMENTS

| | | |
|---|---|---|
| CN | 202268376 | 6/2002 |
| CN | 202434495 | 9/2012 |
| TW | M433003 | 7/2012 |
| TW | 201244124 | 11/2012 |

* cited by examiner

*Primary Examiner* — Bradley Duckworth
(74) *Attorney, Agent, or Firm* — Hauptman Ham, LLP

(57) ABSTRACT

The present invention provides a mounting bracket for a junction box utilized for solar cell, a junction box with the mounting bracket, and the solar cell module. The mounting bracket for the junction box comprises a joint arm, an insert strip, and a hook. The insert strip comprises a first elastic strip connecting with the joint arm, a joint strip connecting with the first elastic strip and bending towards the joint arm, and a second elastic strip connecting with the joint arm. The insert strip is used for inserting into the frame. At least one of the first and the second elastic strips of the insert strip comprise a first elastic block.

20 Claims, 8 Drawing Sheets

MOUNTING BRACKET FOR JUNCTION BOX, JUNCTION BOX WITH THE MOUNTING BRACKET, AND SOLAR CELL MODULE

TECHNICAL FIELD OF THE INVENTION

The present invention relates to a field of solar cell technology, and more particularly to a mounting bracket for a junction box, the junction box with the mounting bracket and a solar cell module.

BACKGROUND OF THE INVENTION

Solar energy is a kind of recycling energy. Using electrical power converted from the solar energy can save power and avoid environment pollution. A junction box in a solar energy system is used for connecting solar cells and external power components, to output the power of solar cells.

Generally, an external junction box for a solar cell is fixed on a backside of a solar cell panel by lifting holes or screws. FIGS. 1(a) and 1(b) illustrate a diagram of the external junction box for a solar cell in the prior arts. The external junction box 10 for a solar cell in FIG. 1(a) is hung on the backside of the solar cell panel by the lifting holes 11, and the external junction box 10 for a solar cell in FIG. 1(b) is fixed on the backside of the solar cell panel by the screws 12.

There are some drawbacks for the two kinds of connection structures as follows: hanging on the backside of the solar cell panel by the lifting holes that is instability, and the junction box is easy to drop; and fixing on the backside of the solar cell panel by the screws that needs operation tools and long operation time.

SUMMARY OF THE INVENTION

To solve the above-mentioned drawbacks, an object of the present invention is to provide a mounting bracket for a junction box, the junction box with the mounting bracket and a solar cell module, which are fast installation, easily assembled and disassembled, and solid and reliable.

In order to solve the above-mentioned problems, the present invention provides a mounting bracket for a junction box utilized for solar cells comprising a solar cell panel and a frame arranged on the solar cell panel, wherein the mounting bracket for the junction box comprises a joint arm configured for connecting with the junction box, an insert strip, an extension arm and a hook; the insert strip comprises a first elastic strip connecting with the joint arm, a joint strip connecting with the first elastic strip and bending towards the joint arm, and a second elastic strip connecting with the joint strip; the insert strip is used for inserting into the frame, which comprises an upper edge, a lower edge, and a lateral edge connecting the upper edge and the lower edge; the lateral edge contacts the joint strip, the lower edge contacts the first elastic strip, and the upper edge contacts the second elastic strip; the extension arm is connected with the joint arm and extends away from the joint arm; the hook is formed on the extension arm and clamps the lateral edge of the frame with the joint strip to lock the mounting bracket for the junction box to the frame; and second elastic strip of the insert strip comprises a first elastic block, and when the insert strip is inserted into the frame of the solar cell panel, the first elastic block is pressed fit on an inside of the upper edge of the frame, to strengthen a connection between the mounting bracket and the frame.

Additionally, the first elastic strip of the insert strip comprises a second elastic block, and when the insert strip is inserted into the frame of the solar cell panel, the second elastic block is pressed fit on an inside of the lower edge of the frame.

Additionally, the hook can also be an arc-shaped spring, and the terminal or the bottom of the arc-shaped hook are pressed fit to the outside of the lateral edge.

Additionally, a space is between the plane of the extension arm and the plane of the first elastic strip, and when the insert strip is inserted into the frame, the lower edge of the frame is inserted into the space.

Additionally, the extension arm further comprises a third elastic block, which is set near to the joint arm, and when the insert strip is inserted into the frame of the panel, the third elastic block is deformed for compressed by the lower edge of the frame, to strengthen the connection between the mounting bracket and the frame.

Additionally, the mounting bracket further comprises an operation handle connected with the joint arm, using for pushing the mounting bracket for the junction box into the frame and pulling the mounting bracket for the junction box from the frame by operating the operation handle.

Additionally, the mounting bracket further comprises an unlocking handle set on a terminal of the hook away from the joint arm, using for make the hook released from the outside of the lateral edge of the frame.

Additionally, a number of the joint arm, the insert strip, and the hook is each two, and the two joint arms, the two insert strips, and the two hooks are set symmetrically.

Additionally, a plurality of holes configured for screws to extend through to thereby connect the junction box and the mounting bracket together are set in the joint arm.

Additionally, the joint arms, insert strips, and hooks are formed in one-piece.

The present invention further provides a junction box comprising the mounting bracket described above. The junction box is connected with the joint arm by a plurality of screws.

The present invention further provides a solar cell module comprising a solar cell panel, a frame, and the mounting bracket described above. The frame is set around the solar cell panel; and the insert strip of the mounting bracket is inserted into a capacity space defined by an upper edge, a lower edge, and a lateral edge connecting the upper edge and the lower edge of the frame.

The advantage of the present invention is that at least one of the first and the second elastic strips of the insert strip comprises a first elastic block, and when the insert strip is inserted into the frame of the solar cell panel, the first elastic block is pressed fit on the inside of the either upper or lower edge of the panel frame, to strengthen the joint part of the mounting bracket and the frame. Meanwhile, there are hooks on the mounting bracket for the junction box, and when the insert strip is inserted into the fame of the solar cell, the hook are used for fixing to the outside of the lateral edge of the frame, in order to lock the mounting bracket for the junction box to the frame. The first elastic block is compressed with the hook, which can firmly fix the junction box on the solar cell panel.

DETAILED DESCRIPTION OF THE INVENTION

Embodiments of a mounting bracket for a junction box, the junction box with the mounting bracket and a solar cell module by the present invention are described in detail with the following accompanying diagrams.

Figure 1A:
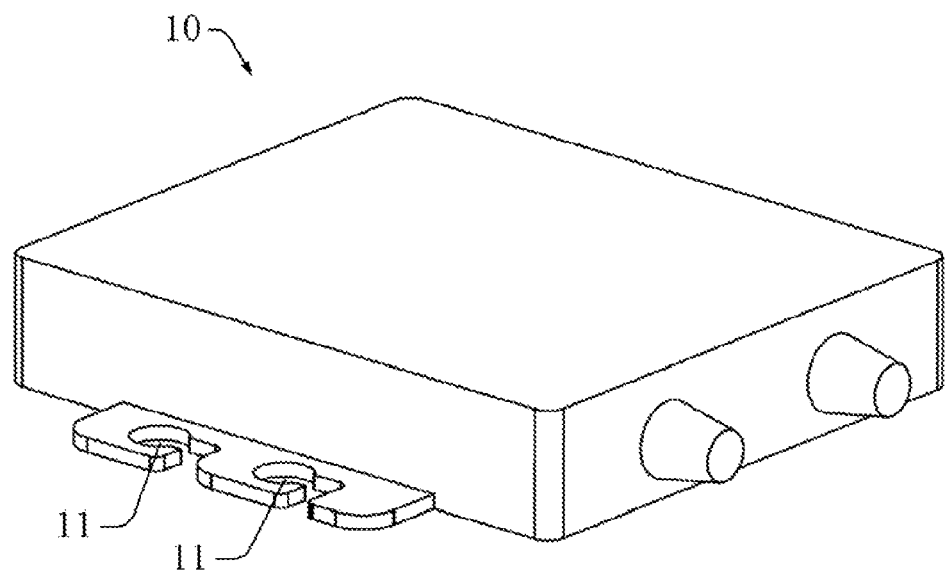
FIGS. 1(a) and 1(b) illustrate a diagram of the external junction box for a solar cell in prior arts.
Figure 1B:
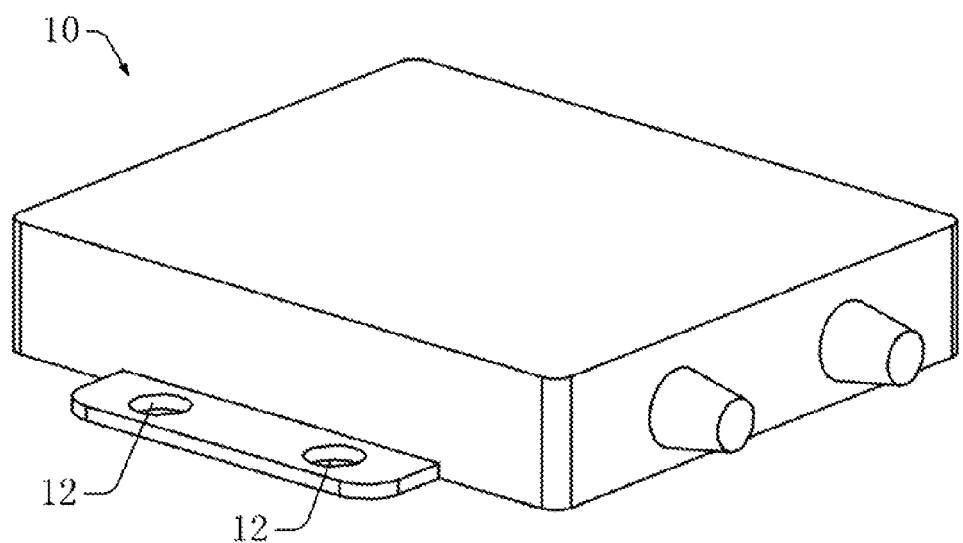
Figure 2A:
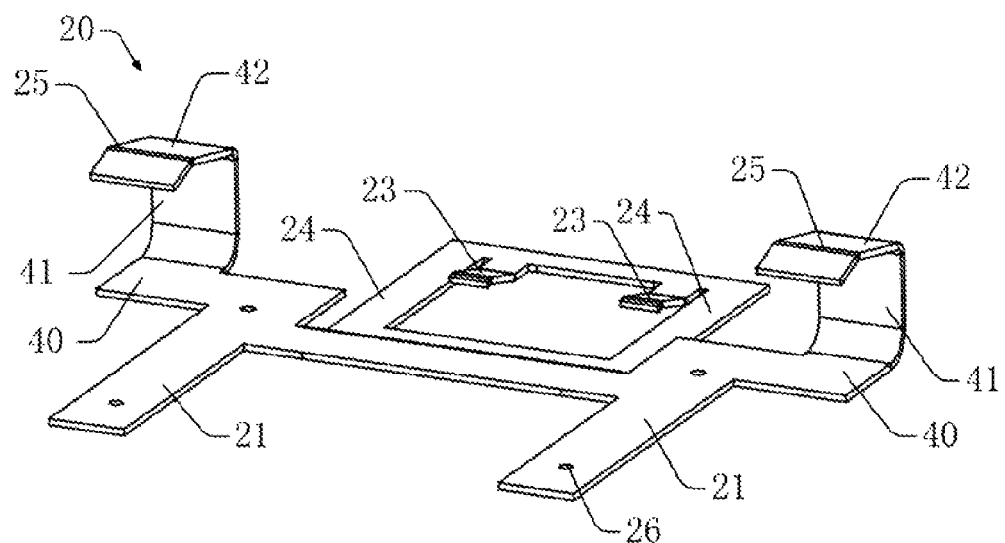
FIG. 2(a) illustrates a diagram of a mounting bracket for a junction box in an embodiment of the present invention.
Figure 2B:
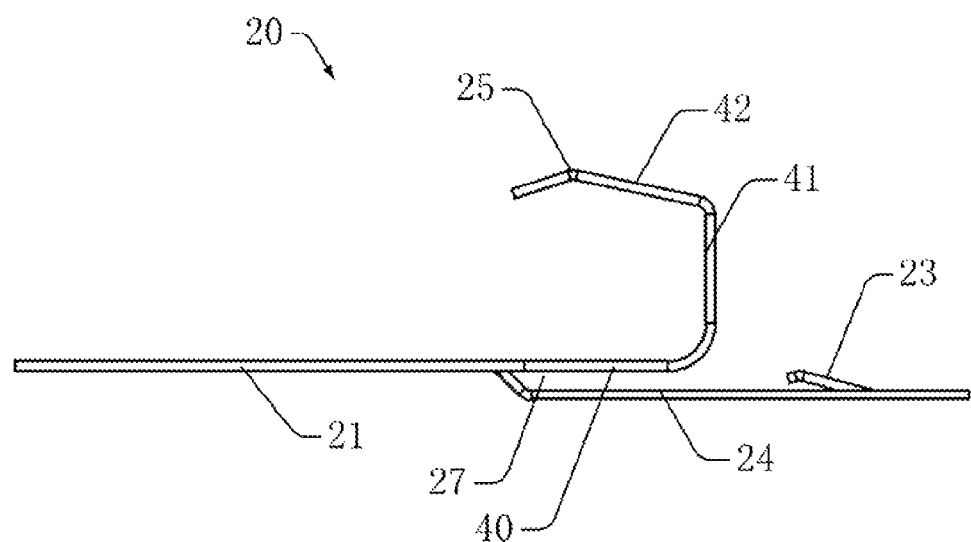
FIG. 2(b) illustrates a side-view diagram of FIG. 2(a).
Figure 2C:
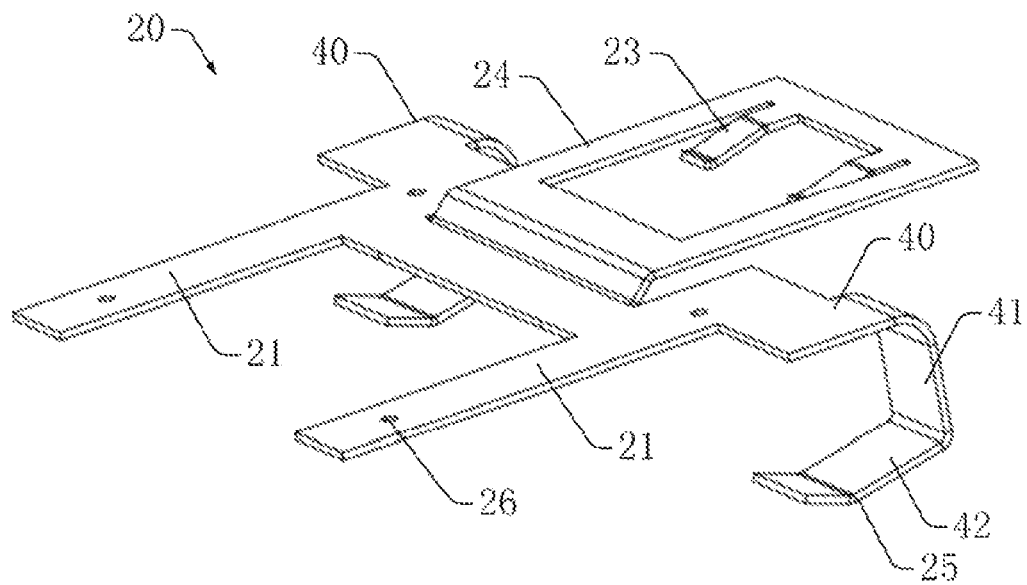
FIG. 2(c) illustrates a diagram of the mounting bracket for the junction box of FIG. 2(a) viewing from another angle.

FIG. 2(a) illustrates a diagram of a mounting bracket for a junction box in an embodiment of the present invention. FIG. 2(b) illustrates a side-view diagram of FIG. 2(a). FIG. 2(c) illustrates a diagram of the mounting bracket for the junction box of FIG. 2(a) viewing from another angle. Referring to FIGS. 2(a), 2(b), and 2(c), a mounting bracket 20 for a junction box in this embodiment is used for solar cell module which comprises a solar cell panel 32, and a frame 31 (referring to FIG. 4(a)). The frame 31 is set around edge of the solar cell panel 32. The mounting bracket 20 comprises joint arms 21, insert strips, and hooks 23. The frame 31 comprises an upper edge, a lower edge, and a lateral edge connecting the upper edge and the lower edge. The upper edge and the lower edge are parallel with each other. The upper edge joints to a second elastic strip 42, the lower edge joints to a first elastic strip 40, and the lateral edge joints to a joint strip 41.

The joint arms 21 are used for connecting the junction box. A plurality of holes 26 are set in the joint arms 21, and other holes corresponding to the holes 26 are set in the junction box (not shown in figures). A plurality of screws pass through the holes and cooperate with the holes, to fix the joint arms 21 to the junction box, and then fix the mounting bracket 20 to the junction box.

The insert strip comprises the first elastic strip 40 which joints to the joint arm 21. The joint strip 41 joints to the first elastic strip 40 and bends towards the connecting arm 21, and the second elastic strip 42 joints to the joint strip 41. The insert strip is used for inserting into the frame 31 of the solar cell panel. The first elastic strip 40 comprises the second elastic block 22 and the second elastic strip 42 of the inset strip comprises the first elastic block 25. When the insert strip is inserted into the frame 31 of the solar cell panel, the first elastic block 25 is pressed fit on an inside of the upper edge of the frame 31, and the second elastic block 22 is pressed fit on an inside of the lower edge of the frame 31, for the first elastic block 25 is pressed by the frame 31 of the solar cell panel, in order to strengthen connection between the mounting bracket 20 and the frame 31 of the solar cell panel.

Figure 2D:
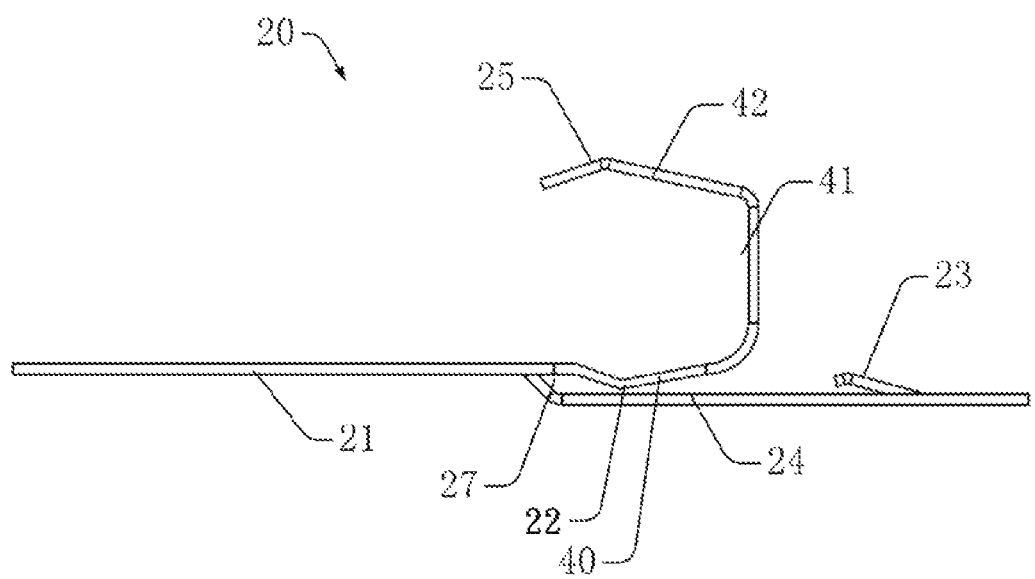
FIG. 2(d) illustrates a diagram of a mounting bracket for a junction box in one embodiment of the present invention.

In this embodiment, the first elastic block 25 is set at the second elastic strip 42. In other embodiments, the location and amount of the first elastic block 25 is variable. For example, a plurality of the first elastic blocks 25 are set at the second elastic strip 42, or one or a plurality of the second elastic blocks 22 are set at the first elastic strip 40, or one or a plurality of the first elastic blocks 25 are set at the second elastic strip 42 and one or a plurality of the second elastic blocks 22 are set at the first elastic strip 40, respectively. All the structures mentioned above can strengthen the mounting bracket 20 fixed on the frame 31 of the solar cell panel. As illustrated in FIG. 2(d), the second elastic blocks 22 are set at the first elastic strip 40 and the first elastic blocks 25 are set at the second elastic strip 42, respectively.

The hooks 23 are fixed on the outside of the lateral edge of the frame 31, and joint to the joint arms 21 by an extension arm 24. The hooks 23 are used for fixing the mounting bracket 20 on the frame 31. A space 27 is between the plane of the extension arm 24 and the plane of the first elastic strip 40, as illustrated in FIG. 2(b). When the insert strip is inserted into the frame 31, the lower edge of the frame 31 is inserted into the space 27.

Furthermore, the amount of the joint arms 21, insert strips, and hooks 23 is two, and the two joint arms 21, insert strips, and hooks 23 are set symmetrically in this embodiment as illustrated in FIG. 2(a). In other embodiments of the present invention, more joint arms 21, insert strips, and hooks 23 may be set, so long as the junction box and the mounting bracket 20 can be fixed on the frame 31 of the solar cell panel.

Furthermore, the joint arms 21, insert strips, and hooks 23 are formed in one-piece in this embodiment. So the mounting bracket 20 can only be formed with only one mold to simplify the process.

Figure 3A:
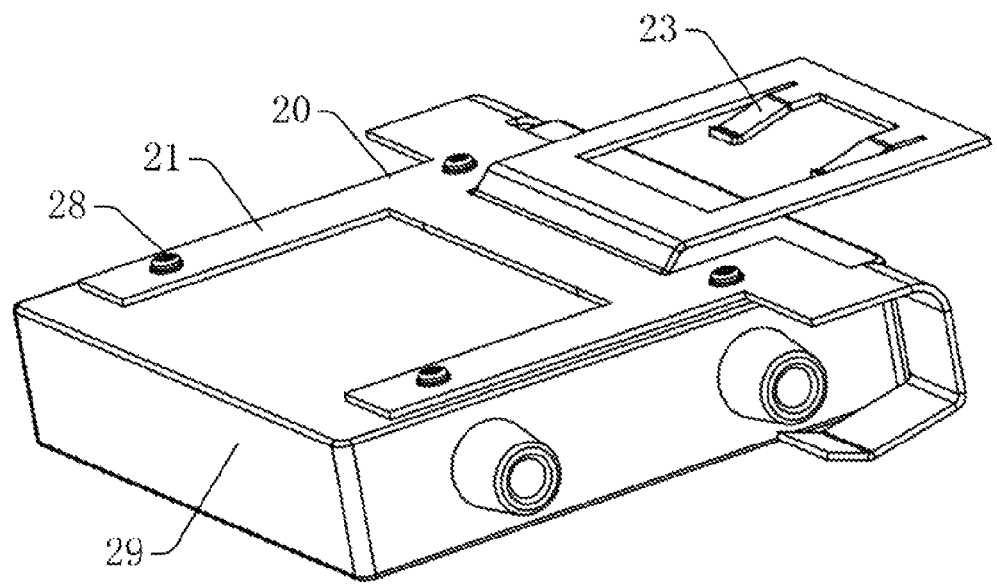
FIG. 3(a) illustrates a diagram of a junction box with the mounting bracket.
Figure 3B:
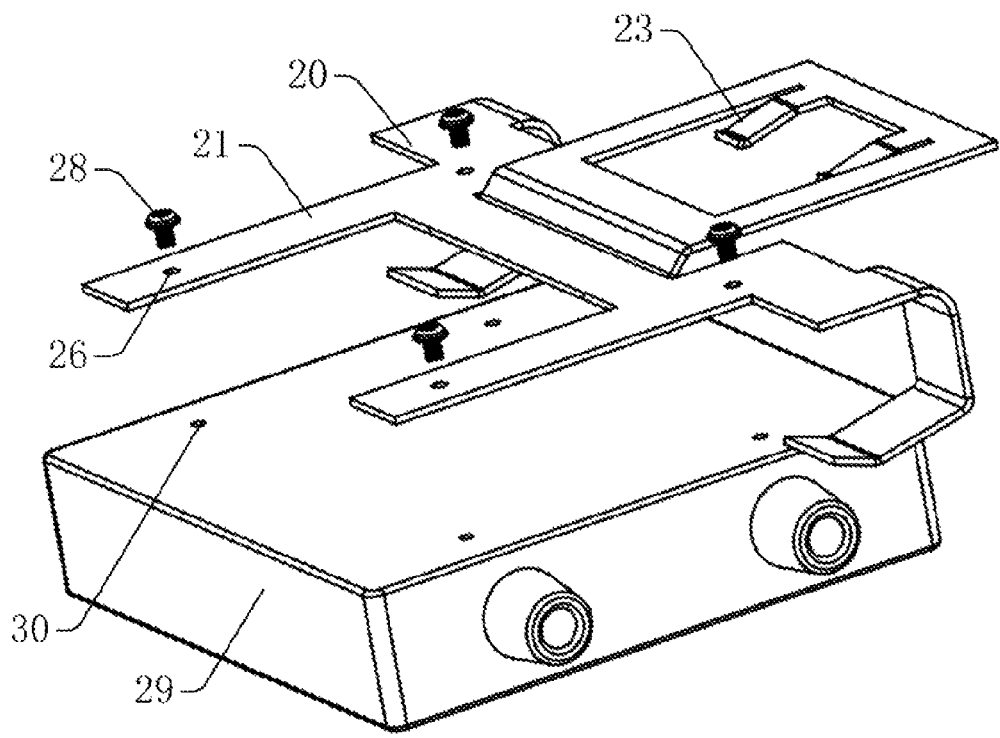
FIG. 3(b) illustrates an exploded diagram of the junction box and the mounting bracket.

FIG. 3(a) illustrates a diagram of a junction box with the mounting bracket 20. FIG. 3(b) illustrates an exploded diagram of the junction box and the mounting bracket 20. Referring to FIGS. 3(a) and 3(b), a plurality of screws 28 pass through holes 26, and then are jointed to screw holes 30 in the junction box 29. The screws 28, holes 26, and screws holes 30 are cooperated with each other in order to fix the junction box 29 and the mounting bracket 20. In this embodiment, four screws 28, four holes 26, four screw holes 30, and the locations of them are shown schematically. Of course, amount and locations of the screws 28, holes 26, and screws holes 30 are not restricted by this embodiment. Persons in this technical field can decide the amount and location according to practical requirements, so long as they can be cooperated and can fix the junction box 29 and the mounting bracket 20. In one embodiment, after the junction box is connected to the mounting bracket 20, the edge of the junction box 29 inserted into the mounting bracket 20 is in a same plane with the edge of the joint strip 41, to make the junction box firmly fixed to the frame 31 of the solar cell panel.

Figure 4A:
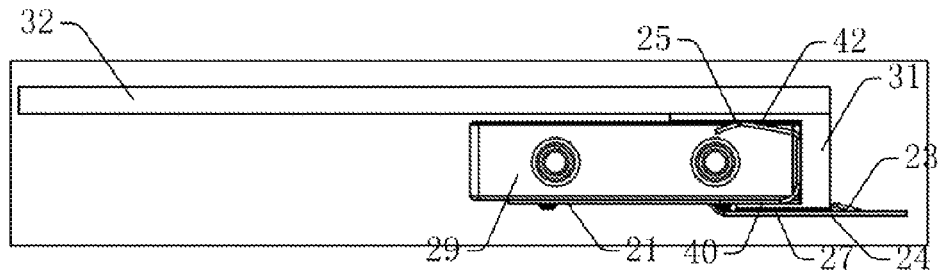
FIG. 4(a) illustrates a diagram of a solar cell module.
Figure 4B:
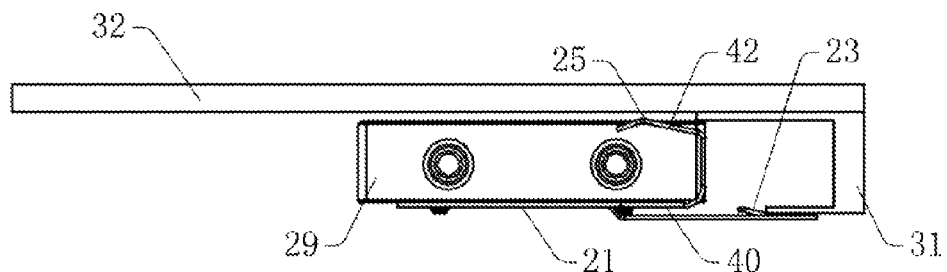
FIG. 4(b) illustrates a diagram of a junction box not fixed on the solar cell module.

FIG. 4(a) illustrates a diagram of a solar cell module, and FIG. 4(b) illustrates a diagram of a junction box not fixed on the solar cell module. Referring to FIGS. 4(a) and 4(b), the solar cell module comprises a solar cell panel 32, a frame 31, and a junction box 29 with a mounting bracket 20. The frame 31 is set around the edge of the solar cell panel 32. A capacity space 33 is defined by an upper edge, a lower edge, and a lateral edge connecting the upper edge and the lower edge of the frame 31. The insert strip of the mounting bracket 20 is inserted into the capacity space 33 of the frame 31, and the lower edge is inserted into the space 27. When the insert strip is inserted into the capacity space 33, the first elastic block 25 is deformed for compressed by the frame 31, to be fixed on the inside of either the upper or the lower edge of the frame. It can fix the junction box 29 with the mounting bracket on the solar cell panel 32 through the inside of the frame 31, and make the joint structure of the mounting bracket 20 and the frame 31 more strengthen. The hooks 23 are fixed on the outside of lateral edge, to lock the junction box 29 with the mounting bracket on the solar cell panel 32 from the outside of the frame 31.

Figure 5A:
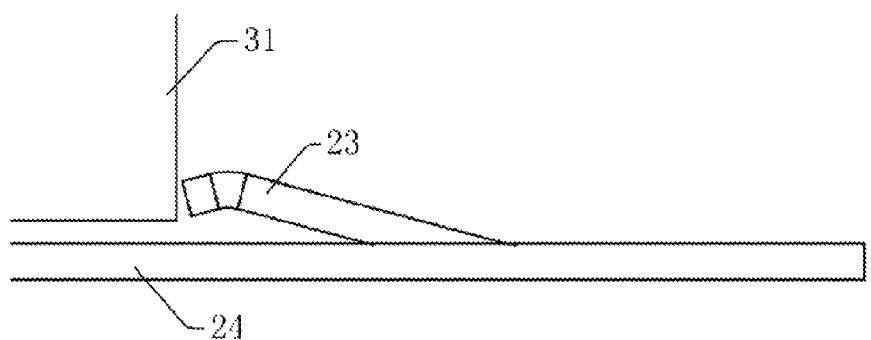
FIGS. 5(a) and 5(b) illustrate diagrams of the hook.
Figure 5B:
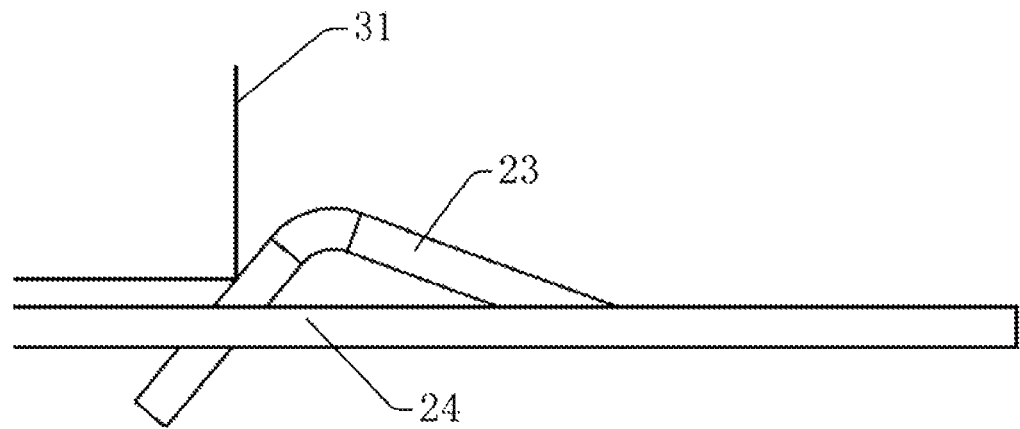

Furthermore, the hook 23 can also be an arc-shaped spring. According to the radians of the hook 23, the touching point to the frame 31 is variable. FIGS. 5(a) and 5(b) illustrate diagrams of the hook 23. Referring to FIG. 5(a), the terminal of the arc-shaped hook 23 is pressed fit to the outside of lateral edge. Referring to FIG. 5(b), the bottom of the arc shaped hook 23 is pressed fit to the outside of lateral edge. Using the structures mentioned above, the junction box 29 with the mounting bracket can be locked on the solar cell panel from the outside of the frame 31.

Figure 6A:
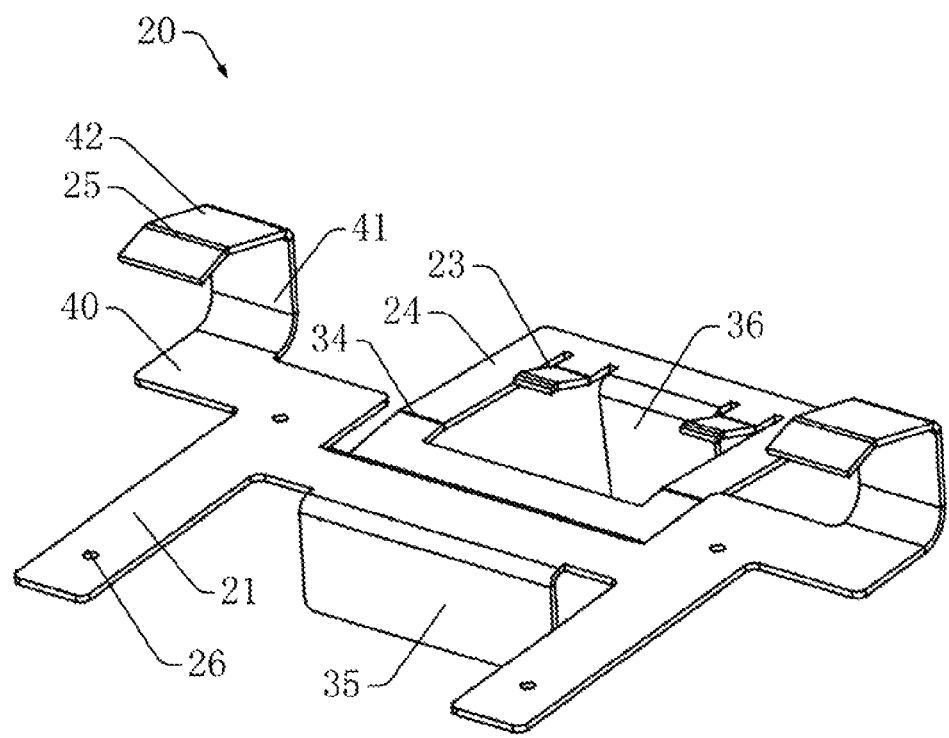
FIG. 6(a) illustrates a diagram of a mounting bracket for the junction box in another embodiment.
Figure 6B:
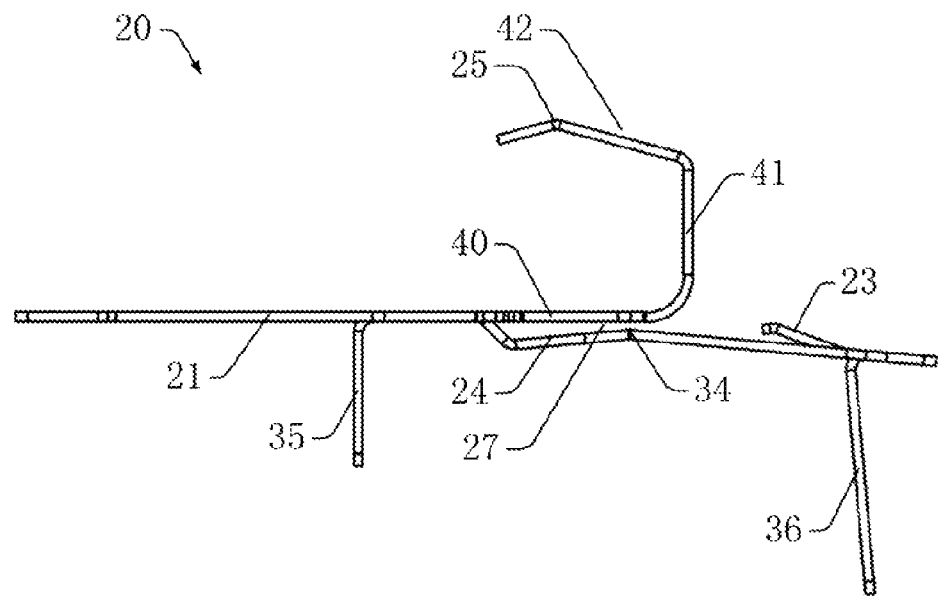
FIG. 6(b) illustrates a side-view diagram of the mounting bracket in FIG. 6(a).
Figure 6C:
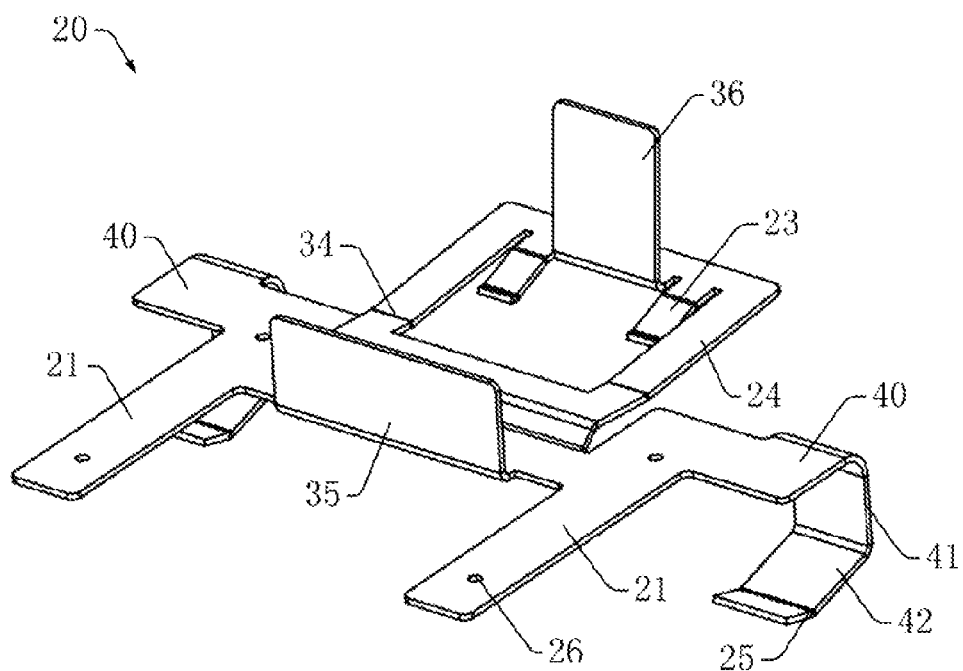
FIG. 6(c) illustrates a diagram of the mounting bracket in FIG. 6(a) viewing from another angle.

Furthermore, in another embodiment of the present invention, the mounting bracket 20 also comprises a second elastic block towards the frame of the solar cell panel. FIG. 6(a) illustrates a diagram of a mounting bracket for the junction box in another embodiment. FIG. 6(b) illustrates a side-view diagram of the mounting bracket in FIG. 6(a), and FIG. 6(c) is a diagram of the mounting bracket in FIG. 6(a) from another angle. In this embodiment, the mounting bracket 20 for the junction box also comprises a third elastic block 34, wherein the third elastic block 34 is set on the extension arm 24 and near to the joint arm. That is the third elastic block 34 is set in the space 27 between the plane of the extension arm 24 and the plane of the first elastic strip 40. When the insert strip is inserted into the frame 31, the lower edge of the frame 31 is inserted into the space 27, and then the third elastic block 34 is deformed for compressed by the lower edge of the frame 31, to be fixed on the lower edge of the frame 31. Using the structure mentioned above, the joint part of the mounting bracket 20 and the frame 31 of the solar cell panel is strengthen, and then the junction box 29 is locked on the solar cell panel 32 from the outside of the frame 31. The third elastic block 34, the first elastic block 25 and the hooks 23 joint together, that are used for fixing the junction box with the mounting bracket on the solar cell panel.

Furthermore, in another embodiment of the present invention, the mounting bracket 20 also comprises an operation handle 35, which is used to push the mounting bracket 20 into the frame 31 of the solar cell panel or pull the mounting bracket 20 from the frame 31 of the solar cell panel. Referring to FIGS. 6(a), 6(b), and 6(c), the operation handle 35 is set on the bottom of the joint arms 21. The junction box 29 with the mounting bracket can be easily pushed into the frame 31 of the solar cell panel or pulled from the frame 31 of the solar cell panel by operating the operation handle 35.

Furthermore, in another embodiment of the present invention, the mounting bracket 20 also comprises an unlocking handle 36 which is to release the hook 23 from the lateral edge of the frame 31. Referring to FIGS. 6(a), 6(b), and 6(c), the unlocking handle 36 is set on a terminal of the hook 23 away from the joint arm 21. Pulling the unlocking handle 35 can make the hook 23 released from the outside of the lateral edge of the frame 31. Of course, other structures, besides the unlocking handle 36, also can be used for making the hook 23 released from the lateral edge of the frame 31. For example, it can also make the hook 23 released from the lateral edge of the frame 31 to push the end terminal of the hook 23 to make the hook 23 tilted. Both the operation handle 35 and the unlocking handle 36 can also be set together to push the junction box 29 with the mounting bracket into the frame of the solar cell panel.

Figure 7A:
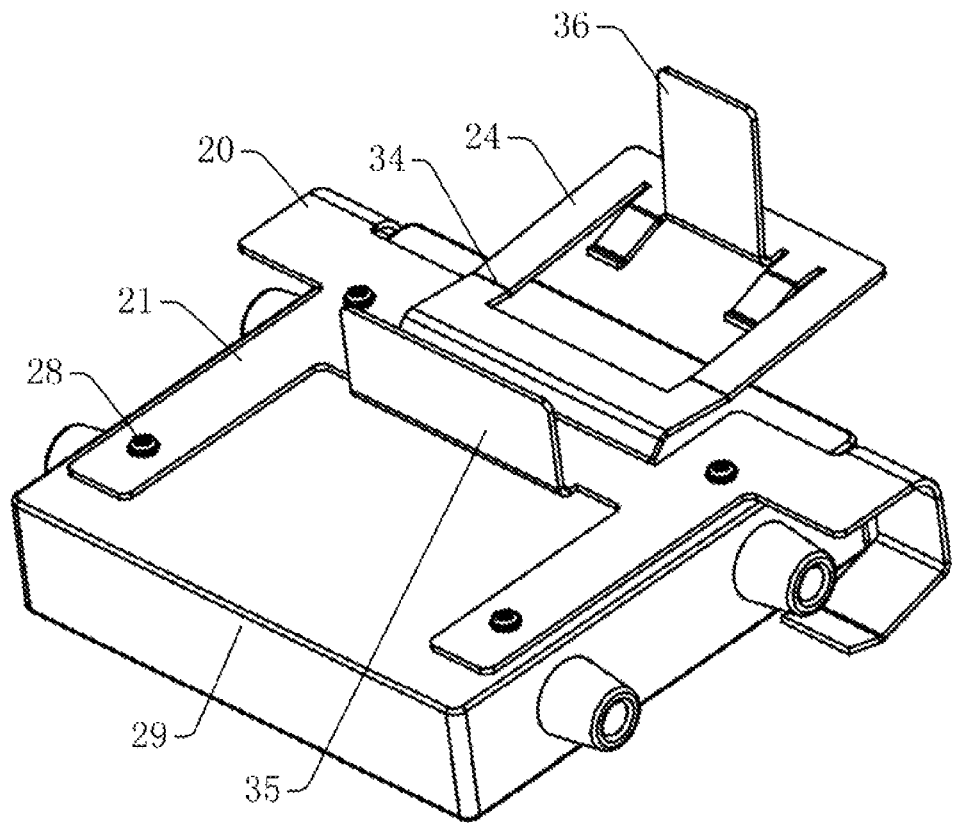
FIG. 7(a) illustrates a diagram of the junction box with the mounting bracket in another embodiment of the present invention.

FIG. 7(a) illustrates a diagram of the junction box with the mounting bracket in another embodiment of the present invention. Referring to FIG. 7(a), the junction box 29 is set on the opposite side of the joint arm 21 to the side of the joint arm 21 which the operation handle 35 and the unlocking handle 36 are set on. So, to operate the operation handle 35 and the unlocking handle 36 can not block the junction box 29 inserting into the frame of the solar cell panel.

Figure 7B:
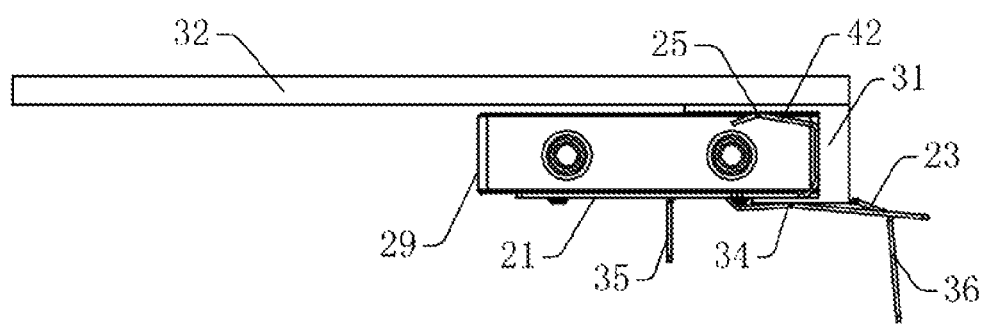
FIG. 7(b) illustrates a diagram of a solar cell module in another embodiment of the present invention.

FIG. 7(b) illustrates a diagram of a solar cell module in another embodiment of the present invention. Referring to FIG. 7(b), the solar cell module comprises the solar cell panel 32, the frame 31 and the junction box 29 with the mounting bracket. The junction box 29 with the mounting bracket is inserted into the frame 31 of the solar cell panel 32, and the bottom of the frame 31 is inserted into the space 27. The third elastic block 34 is deformed for compressed by the frame 31, to be fixed on the lower edge. The third elastic block 34, the first elastic block 25 and the hooks 23 joint together, that are used for fixing the junction box with the mounting bracket on the solar cell panel.

The present invention has been disclosed as the preferred embodiments above, however the above preferred embodiments are not described for limiting the present invention. Various modifications, alterations and improvements can be made by persons skilled in this art without departing from the spirits and principles of the present invention, and therefore the protection scope of the present invention is based on the range defined by the claims.

What is claimed is:

1. A mounting bracket for a junction box utilized for solar cells comprising a solar cell panel and a frame arranged on the solar cell panel, wherein
   the mounting bracket for the junction box comprises a joint arm configured for connecting with the junction box, an insert strip, an extension arm and a hook;
   the insert strip comprises a first elastic strip connecting with the joint arm, a joint strip connecting with the first elastic strip and bending towards the joint arm, and a second elastic strip connecting with the joint strip;
   the insert strip is used for inserting into the frame, which comprises an upper edge, a lower edge, and a lateral edge connecting the upper edge and the lower edge;
   the lateral edge contacts the joint strip, the lower edge contacts the first elastic strip, and the upper edge contacts the second elastic strip;
   the extension arm is connected with the joint arm and extends away from the joint arm;
   the hook is formed on the extension arm and clamps the lateral edge of the frame with the joint strip to lock the mounting bracket for the junction box to the frame; and
   the second elastic strip of the insert strip comprises a first elastic block, and when the insert strip is inserted into the frame of the solar cell panel, the first elastic block is pressed fit on an inside of the upper edge of the frame, to strengthen a connection between the mounting bracket and the frame.

2. The mounting bracket for the junction box of claim 1, wherein the first elastic strip of the insert strip comprises a second elastic block, and when the insert strip is inserted into the frame of the solar cell panel, the second elastic block is pressed fit on an inside of the lower edge of the frame.

3. The mounting bracket for the junction box of claim 1, wherein the hook is an arc-shaped spring, and the terminal or the bottom of the arc-shaped hook is pressed fit to the outside of the lateral edge.

4. The mounting bracket for the junction box of claim 1, wherein a space is between a plane of the extension arm and a plane of the first elastic strip, and when the insert strip is inserted into the frame, the lower edge of the frame is inserted into the space.

5. The mounting bracket for the junction box of claim 4, wherein the extension arm further comprises a third elastic block, which is set near to the joint arm, and when the insert strip is inserted into the frame of the panel, the third elastic block is deformed to be compressed by the lower edge of the frame, to strengthen the connection between the mounting bracket and the frame.

6. The mounting bracket for the junction box of claim 1, wherein the mounting bracket further comprises an operation handle connected with the joint arm, utilized for pushing the insert strip of the mounting bracket for the junction box in the frame and pulling the mounting bracket for the junction box from the frame by operating the operation handle.

7. The mounting bracket for the junction box of claim 1, wherein the mounting bracket further comprises an unlocking handle set on a terminal of the hook away from the joint arm, utilized for releasing the hook from the outside of the lateral edge of the frame.

8. The mounting bracket for the junction box of claim 1, wherein the joint arm is a first joint arm of a set of two joint arms, the insert strip is a first insert strip of a set of two insert strips, and the hook is a first hook of a set of two hooks, and the two joint arms, the two insert strips, and the two hooks are set symmetrically.

9. The mounting bracket for the junction box of claim 1, wherein a plurality of holes configured for screws to extend through to thereby connect the junction box and the mounting bracket together are set in the joint arm.

10. The mounting bracket for the junction box of claim 1, wherein the joint arms, the insert strips, and the hooks are formed in one-piece.

11. A junction box, wherein the junction box comprises the mounting bracket described in claim 1, and the junction box is connected with the joint arm by a plurality of screws.

12. A mounting bracket comprising:
a joint arm configured to be connected to a junction box for a solar cell, the solar cell comprising a solar panel and a frame connected to the solar panel, the frame comprising an upper edge, a lower edge, and a lateral edge connecting the upper edge and the lower edge;
an insert strip configured to be inserted into the frame, the insert strip comprising:
a first elastic strip connected with the joint arm;
a joint strip connected with the first elastic strip and bent toward the joint arm; and
a second elastic strip connected with the joint strip, the second elastic strip comprising a first elastic block;
an extension arm; and
a hook on the extension arm,
wherein
the joint strip is configured to contact the lateral edge of the frame if the insert strip is inserted into the frame,
the first elastic strip is configured to contact the lower edge of the frame if the insert strip is inserted into the frame,
the second elastic strip is configured to contact the upper edge of the frame if the insert strip is inserted into the frame,
the hook is configured to contact an outside of the lateral edge of the frame if the insert strip is inserted into the frame, and the joint strip and the hook are configured to couple the mounting bracket with the frame if the insert strip is inserted into the frame, and
the first elastic block is configured to be press fit against an inside of edge of the frame if the insert strip is inserted into the frame to strengthen the coupling of the mounting bracket with the frame.

13. The mounting bracket of claim 12, wherein the first elastic strip comprises a second elastic block configured to be press fit against an inside of the lower edge of the frame if the insert strip is inserted into the frame.

14. The mounting bracket of claim 12, wherein the hook is an arc-shaped spring, and a terminal or an end of the arc-shaped spring is configured to be press fit against the outside of the lateral edge of the frame.

15. The mounting bracket of claim 12, wherein the extension arm and the first elastic strip are separated by a space configured to receive the lower edge of the frame if the insert strip is inserted into the frame.

16. The mounting bracket of claim 15, wherein the extension arm comprises a second elastic block on a joint arm-side of the extension arm, and the second elastic block is configured to be deformed if the insert strip is inserted into the frame to cause the lower edge of the frame to be sandwiched between the insert strip and the second elastic block to strengthen the coupling of the mounting bracket with the frame.

17. The mounting bracket of claim 12, wherein the mounting bracket further comprises an operation handle connected with the joint arm, the operation handle being configured to facilitate pushing the insert strip of the mounting bracket into the frame and pulling the mounting bracket out of the frame.

18. The mounting bracket of claim 12, wherein the mounting bracket further comprises an unlocking handle on a terminal of the hook, the terminal of the hook being an end of the hook furthest away from the joint arm, the unlocking handle being configured to release the hook from the outside of the lateral edge of the frame.

19. The mounting bracket of claim 12, wherein the joint arm is a first joint arm of a set of two joint arms, the insert strip is a first insert strip of a set of two insert strips, and the hook is a first hook of a set of two hooks, and the two joint arms, the two insert strips, and the two hooks are set symmetrically.

20. The mounting bracket of claim 12, wherein the joint arm, the insert strip, and the hook are one continuous piece.

* * * * *